United States Patent [19]

Smith, Jr.

[11] 4,250,052

[45] Feb. 10, 1981

[54] CATALYST STRUCTURE AND A PROCESS FOR ITS PREPARATION

[75] Inventor: Lawrence A. Smith, Jr., Houston, Tex.

[73] Assignee: Chemical Research & Licensing Company, Houston, Tex.

[21] Appl. No.: 940,466

[22] Filed: Sep. 8, 1978

[51] Int. Cl.² ..................... B01J 31/06; B01J 35/02
[52] U.S. Cl. .............................. 252/426; 252/477 R
[58] Field of Search ................ 252/426, 430, 477 R; 260/42.54, 42.55

[56] References Cited

U.S. PATENT DOCUMENTS

| | | | |
|---|---|---|---|
| 2,366,007 | 12/1944 | D'Alelio | 521/3.3 X |
| 2,480,821 | 9/1949 | Connell | 260/42.55 |
| 2,500,149 | 3/1950 | Boyer | 252/430 X |
| 3,965,039 | 6/1976 | Chaplits et al. | 252/426 |

*Primary Examiner*—W. J. Shine
*Attorney, Agent, or Firm*—Kenneth H. Johnson

[57] ABSTRACT

Sulfonated cation resin catalyst structures are prepared by extruding a vinyl aromatic polymer or copolymer or by depositing a solution containing a vinyl aromatic polymer or copolymer on a base of the desired structure and sulfonating the structure.

7 Claims, No Drawings

CATALYST STRUCTURE AND A PROCESS FOR ITS PREPARATION

BACKGROUND OF THE INVENTION

The present invention relates to acid cation exchange resins (synthetic acid resin catalyst) and in particular to a process for obtaining structures of these materials.

The present inventor has recently developed a novel process applicable to several types of chemical reactions. One of these is disclosed in U.S. application Ser. No. 928,397, filed July 27, 1978. Briefly, that process is the separation of isobutene from a $C_4$ feed stream by using an acid cation exchange resin as a distillation column packing wherein the isobutene is dimerized and recovered as a bottom fraction and the other $C_4$'s in the stream leave the top of the column.

To carry out this new process, the known acid cation exchange in granular form was sown into pockets in a cloth belt, and the belt wrapped around a wire mesh for support. This system worked, however, it is apparent that those shapes and form designed for use as distillation packing material would be superior. Various attempts were made to attach granular resin to distillation saddles, and to dissolve the cation resin in a suitable solvent and coat the desired shape therewith. However, neither method worked. The catalyst with the cation resin attached was very delicate and a solvent could not be found. Furthermore, extruding the cation exchange resin into desired shapes is not possible, since these materials are generally not heat stable at temperatures above 125° C. (Amberlyst Xn-1011 is reported to have a useful life at 175°-200° C.), however, at temperatures higher enough to extrude the materials they would be substantially deactivated.

The acid cation exchange resins are well known and are available in granular form from several sources. The catalyst contain sulfonic acid groups and are obtained by polymerization or copolymerization of aromatic vinyl compounds followed by sulfonation.

SUMMARY OF THE INVENTION

Briefly stated, the present invention is a process for preparing structures of sulfonated cation resins comprising:

(a) preparing a vinyl aromatic polymer or copolymer structure by
 (1) extruding said polymer or copolymer or
 (2) dissolving said polymer of copolymer in a solvent and coating a base having a desired shape therewith and removing said solvent and (b) sulfonating said structure.

DETAILED DESCRIPTION OF THE INVENTION

Examples of aromatic vinyl compounds suitable for preparing polymers or copolymers are: styrene, vinyl toluene, vinyl naphthalene, vinyl ethylbenzene, methyl sytrene, vinyl chlorobenzene and vinyl xylene. A large variety of methods may be used for preparing these polymers; for example, polymerization alone or in admixture with other monovinyl compounds, or by crosslinking with polyvinyl compounds, for example, with divinyl benzene, divinyl toluene, divinylphenylether and others. The polymers may be prepared in the presence of absence of solvents or dispersing agents, and various polymerization initiators may be used, e.g., inorganic or organic peroxides, persulfates, etc.

The sulfonic acid group may be introduced into these vinyl aromatic polymers by various known methods; for example, by sulfating the polymers with concentrated sulfuric acid or chlorosulfonic acid, or by copolymerizing aromatic compounds which contain sulfuric acid groups (see e.g., U.S. Pat. No. 2,366,007). Further sulfonic acid groups may be introduced into these polymers which already contain sulfonic acid groups; for example, by treatment with fuming sulfuric acids, i.e., sulfuric acid which contains sulfur trioxide. The treatment with fuming sulfuric acid is preferably carried out at 0° to 150° C., and the sulfuric acid should contain sufficient sulfur trioxide after the reaction. The resulting products preferably contain an average of 1.3 to 1.8 sulfonic acid groups per aromatic nucleus. Particularly, suitable polymers which contain sulfonic acid groups are copolymers of aromatic monovinyl compounds with aromatic polyvinyl compounds, particularly, divinyl compounds, in which the polyvinyl benzene content is preferably 1 to 20% by weight of the copolymer (see for example, German Patent Specification No. 908,247).

The polymers and copolymers are soluble in aromatic and chlorinated hydrocarbons. The degree of crosslinking density will determine the effect of solvents on the crosslinked copolymer, hence for copolymers of styrene and divinyl benzene, for example, the polymerization is not carried out to the point to obtain high crosslinking density, thereby producing soluble copolymers which may be coated from solution on to appropriate supports and crosslinked in place to the desired crosslink density, for example, with ultraviolet light.

However, the use of a support to provide the intrinsic strength of the catalyst, reduces the need for crosslinked polymers.

Suitable base or support materials include glass, ceramic, polymers such as polypropylene, cast thermoset resins, iron, aluminum, and the like. Preferably the support is one to which the polyvinyl material will adhere, however, this is not necessary since the polyvinyl material forms an enclosing envelope over the form and can not fall off.

The form of polymer of copolymer structure may be any of these known in the art for distillation packing, for example, saddles, rings, pellets, discs, plates, tubes and the like.

The invention claimed is:

1. A process for preparing structures of sulfonated cation resin catalyst comprising:
 (a) preparing a vinyl aromatic polymer or copolymer structure by dissolving said polymer or copolymer in a solvent and coating a base having a distillation packing structure therewith and removing said solvent to leave a coating of polymer or copolymer over said base and
 (b) sulfonating said structure.

2. The process according to claim 1 wherein said vinyl aromatic is styrene, vinyl toluene, vinyl naphthalene, vinyl ethylbenzene, methyl styrene, vinyl chlorobenzene, vinyl xylene or mixtures thereof.

3. The process according to claim 2 wherein crosslinking polyvinyl compounds are present in said vinyl aromatic copolymers.

4. The process according to claim 3 wherein said polyvinyl compounds are divinyl benzene, divinyl toluene or divinyl phenyl ether.

5. A catalyst structure prepared by the process of claim 1.

6. A catalyst structure comprising a base having a distillation packing structure and a sulfonated vinyl aromatic polymer or copolymer coating thereover.

7. The catalyst structure according to claim 6 wherein said distillation packing structure is selected from saddles, rings, pellets, discs, plates or tubes.

* * * * *